Figure 1:
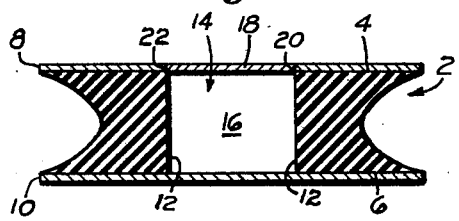

May 26, 1964  W. H. TRASK  3,134,585
SHOCK ATTENUATING DEVICES

Filed Feb. 8, 1960  2 Sheets-Sheet 1

INVENTOR.
Walter H. Trask
BY
Atty.

May 26, 1964 W. H. TRASK 3,134,585
SHOCK ATTENUATING DEVICES
Filed Feb. 8, 1960 2 Sheets-Sheet 2

INVENTOR.
Walter H. Trask
BY
Atty.

3,134,585
Patented May 26, 1964

3,134,585
SHOCK ATTENUATING DEVICES
Walter Haywood Trask, Chicago, Ill., assignor to W. H. Miner, Inc., Chicago, Ill., a corporation of Delaware
Filed Feb. 8, 1960, Ser. No. 7,308
13 Claims. (Cl. 267—1)

This invention relates, generally, to shock attenuating units or devices, so called shock absorbing mechanisms, which dissipate the energy of applied load or impact forces, and it has particular relation to shock absorbing units or devices for use as or in draft gears for railroad cars.

Shock attenuating or absorbing units as described herein employ a resilient member of a material having the property of self-restoration, namely, restoring itself to the configuration it had prior to its distortion by the application of a load force thereto, such characteristic of self-restoration being aided by the factor of securing or bonding the resilient member to a support element which is non-extensible and non-distortable under normal or practical temperatures and pressures. The bonding of the resilient member to the support element permits the material of said member to flow, as by molecular movement, in regions thereof removed from immediate contact with the support element; upon release of the distorting force, the natural resilience or elasticity returns said member back to its undistorted original position relative to the support element. Shock absorbing devices exhibiting the aforementioned characteristics of self-restoration are known in the art, and although generally satisfactory for certain shock absorbing applications, such devices have an undesirably high reaction force and, upon release of the distorting force, a high percentage of the energy of impact stored in the device during distortion is released in the form of recoil.

Accordingly, an object of the present invention is to provide a shock attenuating unit employing a resilient member, such as rubber, and having decreased recoil and increased shock absorbing capacity as compared to the use of the resilient member per se.

Another object of the invention is to increase the ratio of the average force to the peak or maximum force transmitted through a resilient member shock attenuating unit while preserving unchanged those desirable properties of the resilient member, such as simplicity, economy, ruggedness, adaptability, etc.

Another object of the invention is to simplify the construction of a shock absorber employing hydraulic operating principles which will be more economical to manufacture than conventional hydraulic shock absorbers heretofore used.

Another object of this invention is to provide a shock attenuating unit comprising one or more non-extensible support elements bonded to a like number of surfaces of a resilient member having a cavity or chamber containing a flowable dampening medium whereby the hysteresis of the unit as a whole is enhanced.

Still another object of this invention is to provide a shock attenuating unit or device in which the resilient member, bonded to a non-extensible element, provides the primary if not the sole restoring force to return a mass of pressure deformable, substantially non-compressible and non-resilient material, contained within a cavity or chamber in the resilient member, to its original configuration after the deforming force has been dissipated or removed.

Other objects of this invention will, in part, be obvious and appear hereinafter.

This invention is disclosed in the embodiments thereof shown in the accompanying drawings and it comprises the features of construction, combination of elements and arrangement of parts which will be exemplified in the structures hereinafter set forth and the scope of the application as indicated in the appended claims.

Figure 2:
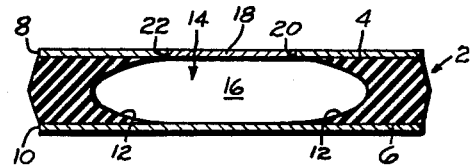
Figure 3:
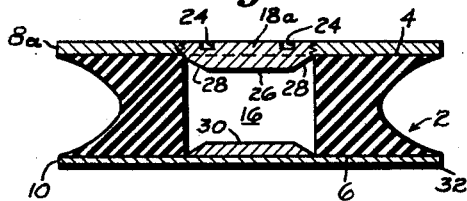
Figure 4:
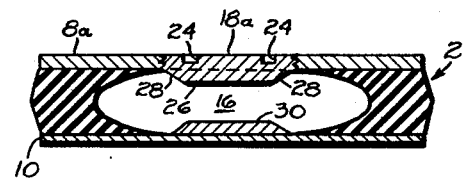
Figure 5:
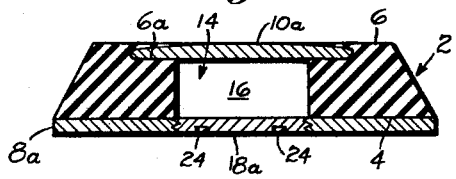
Figure 6:
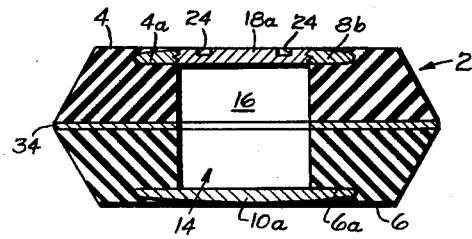
Figure 7:
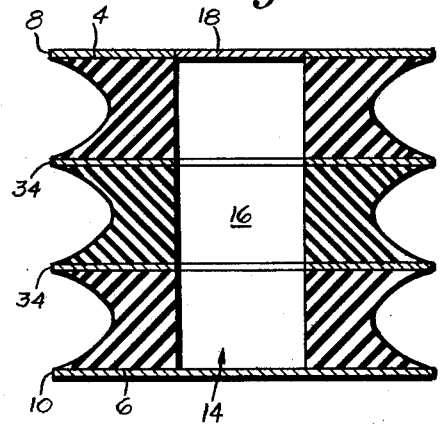
Figure 8:
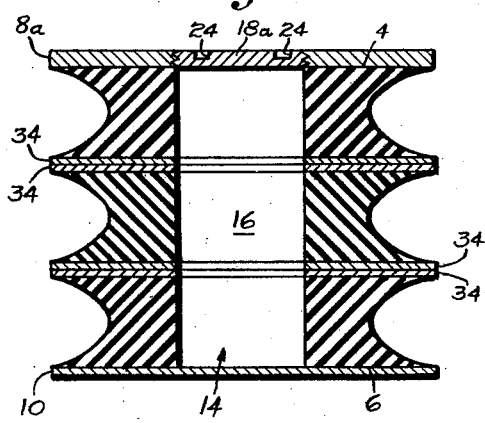

For a more complete understanding of the nature and scope of this invention, reference can be had to the following detailed description, taken together with the accompanying drawings, in which:

FIGURE 1 is an elevational view in section of a unit according to the invention along a vertical plane passing centrally through the unit, FIGURE 2 is a view of the same unit illustrated in FIGURE 1 but showing the unit compressed approximately thirty percent of its original height or thickness, FIGURE 3 shows a unit in elevational section similar to the unit of FIGURE 1 and provided with flow-guide members, FIGURE 4 is illustrative of the configuration that the unit of FIGURE 3 assumes during distortion by the application of a load force thereto, FIGURE 5 is an elevational view in section of another embodiment of the invention along a vertical plane passing centrally through the unit, FIGURE 6 is an elevational view in section of still another embodiment representative of the invention, FIGURE 7 shows in elevational section a modification of the invention involving the stacking of units one adjacent the other, FIGURE 8 is an elevational sectional view showing another embodiment of the invention involving a different manner of combining individual units in a stack, FIGURES 9, 10, 11 and 12 are representations of oscilloscope curves showing the force-distance relationships existing during compression and release of shock attenuating units according to FIGURE 1; the solid line curve is that of a unit having a dampening medium therein, and the dashed line curve is a control curve of an all-rubber, non-dampened conventional unit; the dampening medium used in each of the units corresponding to FIGURES 9, 10, 11 and 12 is asphalt, sand, wax, and an asphalt and sand mixture, respectively.

Referring now to the structural details shown in the drawings, FIGURE 1 shows a shock attenuating unit according to the invention in its normal non-distorted condition and FIGURE 2 shows the same unit in its stressed or distorted condition.

The unit comprises, in general, a resilient member 2 having two opposite and spaced force-receiving surfaces 4 and 6 along which normally non-extensible elements 8 and 10 are bonded. An opening defined by side walls 12 extends through the member 2 from one to the other of the surfaces 4 and 6. The elements 8 and 10 together with the side walls 12 form a chamber 14 for the containment therein of a dampening medium 16.

The resilient member 2 consists of rubber or rubber-like material whereas the elements 8 and 10 are of a material, such as metal, which under normal or practical conditions is non-extensible. Compared to the rubber material of the member 2, the elements 8 and 10 are non-distortable. An element of this type furnishes a support or datum to which the rubber will return and assume its original configuration after having been compressed, provided of course that the rupture point of the rubber has not been exceeded during stress.

The periphery of the resilient member 2 in its non-stressed state may, but need not, be recessed as shown in FIGURES 1 and 3 of the drawings. Recessing of the peripheral edge surface of the rubber pad 2 is desirable in those situations where the unit is embraced in a confining housing (not shown).

To ensure uniform flow of the rubber during compression, the configuration of the chamber 14 should be similar to that of the resilient member 2. In other words, if the resilient member is circular in plan view, the ends of the chamber 14 should likewise be circular. It has been found that uniform flow of the rubber, when in the form of a thick disc, is obtained by providing the chamber 14 in the form of a cylindrical opening.

To facilitate the introduction of the dampening medium 16 into the chamber 14, one of the support elements (element 8 as shown in FIGURES 1 and 2) is provided with an opening which extends therethrough, as defined by the edge surface 20, and which receives a removable closure element 18. The other support element 10 is imperforate.

The closure element 18 as shown in FIGURES 1, 2, and 7 is in the form of a coplanar-surfaced plug or disc having a peripheral edge surface 22 which mates with the edge surface 20. To eliminate leakage when a dampening medium 16 of low viscosity is employed in the chamber 14, a threaded closure element 18a, as shown in FIGURES 3, 4, 5, 6, and 8, can be used in threaded engagement with the support element 8a. A spanner wrench (not shown) having lugs fitting within the spaced depressions 24 can be used to tighten the closure element 18a.

It is necessary to provide a closure element, such as 18 or 18a, only when a core member (not shown) is used during curing and bonding of the rubber to the support elements 8 and 10 to form the resulting opening in the rubber pad 2 as defined by the side walls 12. If the economies of manufacture do not dictate the use of such core member, then the elements 8 and 10 can both be imperforate. For example, the dampening medium can be pre-formed to the size and shape of the opening desired in the rubber pad 2 and encased in a membrane of heat resistant material, if necessary. Such pre-formed plug of dampening material can then be held in a cavity mold, the top and bottom of which comprise imperforate support elements 8 and 10, while rubber is injected to surround the pre-formed plug, and subsequently curing the rubber and bonding same to the elements 8 and 10.

As is illustrated by FIGURES 1 and 2, and FIGURES 3 and 4, the dampening medium 16 within the chamber 14 will flow radially outwardly when the support elements 8 and 10 are displaced toward each other. The closure elements 18a of FIGURES 3 and 4 are provided with protuberances 26 in the nature of flow guides in that they project into the chamber 14 and have bevelled edges 28 which tend to direct the flow of the dampening medium 16. Instead of bevelled edges 28, the flow guide protuberance 26 can be formed with rounded corners or can assume a hemispherical form. In order to obtain symmetrical flow of the dampening medium 16, a second flow guide 30 is preferably provided upon or integral with the other support element 10, as shown in FIGURES 3 and 4.

It has been found that a flow guide with rounded or bevelled edges 28, among other things, reduces the time necessary for the rubber member 2 to restore itself, as well as the dampening medium, to its original non-distorted configuration.

The modification of the invention shown in FIGURE 5 is illustrative of the use of a platelike support element 8a bonded to the entire areal extent of one force-receiving surface 4 of the rubber pad 2, the chamber 14 therein being closed at its other end by a closure or support element 10a bonded to the rubber pad 2 along only a part of the area of the other force-receiving surface 6 of the rubber pad 2, which is of stepped configuration and comprises two levels 6 and 6a. The support element 10a may have non-rounded peripheral corners the same as corners 32 of support element 10, but it is preferable to round such corners and impart a taper to one surface of element 10a, as shown, particularly when element 10a is bonded to the force-receiving surface level 6a, in order to eliminate lines of high stress concentration which would tend to impair the strength of the bond between the rubber member 2 and the metal element 10a.

The unit of FIGURE 5 lends itself readily to stacking with the platelike support elements 8a in "back-to-back" engagement. To achieve the equivalent of such stacking while saving on material used, the unit of FIGURE 6 is shown. Here, a central support element 34 extends through the rubber member 2 intermediate the force-receiving surfaces 4 and 6 thereof. This central element 34 may be imperforate or have an opening therethrough, as shown, aligned with the opening in the rubber member 2. As in FIGURE 5, outer support elements 10a and 8b are bonded to the rubber member 2 along a part only of the stepped force-receiving surfaces 4 and 6 of the member, i.e., along surfaces 4a and 6a, the support element 8b being provided with a removable threaded chamber closing plug 18a as hereinbefore described in connection with FIGURE 3. The elements 10a and 8b, together with plug 18a, not only effect closure of the ends of the chamber 14, but also serve as support elements, similar to the support elements 8 and 10, in that they provide a datum towards which reverse flow of the rubber will occur upon termination of the distorting force.

Additional modes of stacking or multiplying the basic unit of FIGURE 1 or FIGURE 3 are shown in FIGURES 7 and 8. FIGURE 8 shows the use of units similar to that of FIGURE 1, stacked one upon the other. By the use of pairs of perforate support elements 34 intermediate the ends of the stack of units, a continuous chamber 14 extending through the whole stack is obtained. The intermediate elements 34 are each bonded to an adjacent surface of the rubber member 2 and adjacent elements 34 are in surface-to-surface engagement with each other. A unitary construction of stacked units is shown in FIGURE 7 in which a plurality of perforate support elements 34 are each bonded to extend through the rubber member 2 parallel to and intermediate the force-receiving surfaces 4 and 6. Openings in each of such intermediate elements 34 are aligned with the opening in the member 2 to form one continuous chamber 14 which is closed at one end by an imperforate support element 10 and at its other end by a perforate element 8 having a removable closure member 18 fitted therein. Of course, the support elements 34 of FIGURE 8 can be imperforate or fitted with closure plugs, such as 18a, if a plurality of individual chambers 14 is required, as contrasted to the single continuous chamber shown.

Although not shown, it is within the scope of this invention to provide a plurality of radially spaced chambers, such as 14, within a resilient member, as opposed to only one centrally extending chamber, the chambers containing a flowable dampening medium. The particular shape or number and location of chambers can be chosen to optimize the flow characteristics of the non-compressible dampening medium, such that its resistance to flow or deformation will dominate or appreciably affect the overall resistance-to-distortion characteristics of the unit as a whole, and particularly affect the normal resistance-to-distortion characteristic of the resilient member.

The solid line force-distance curves shown in FIGURES 9 through 12 are based on shock attenuating units according to the invention having the elevational configuration shown in FIGURE 1. The units are circular in plan view and of 6-inch diameter with a 3¼ inch diameter central chamber 14 in a rubber member 2 of approximately 70 durometer hardness and of 1¼ inch thickness and recessed approximately 1 inch deep around its periphery. The non-extensible support elements or plates 8 and 10 bonded to rubber member 2 are of mild steel 0.135 inch in thickness. Except for the absence of a chamber 14, the dimensions of the all-rubber control units, the curves of which are shown in the dashed lines of FIGURES 9 through 12, are identical to the units according to the invention.

Figure 9:
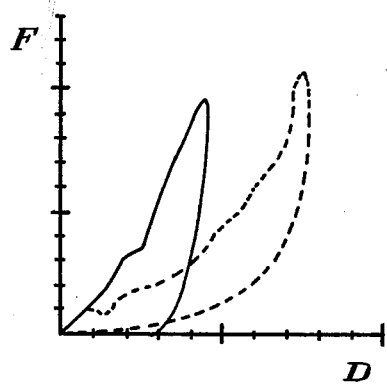

The dampening medium 16 in the chamber 14 of the unit, the force-distance diagram of which is represented in the upper portion of FIGURE 9, is an air-blown asphalt having a penetration value of 0 to 10 units. Penetration is a measurement of the relative hardness or consistency of asphalt and is made by measuring the distance that a standard needle will penetrate vertically into a sample of asphalt under known conditions of temperature, loading and time. Normal penetration is made at 77° F., the needle being loaded with 100 grams and the load being applied for five seconds. The unit of penetration is $\frac{1}{10}$ millimeter, about $\frac{1}{254}$ inch.

Figure 10:
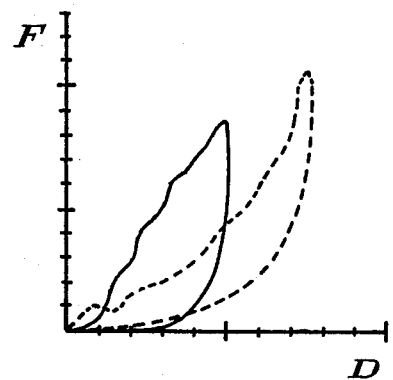

The dampening medium 16 in the unit having the force-distance relationship shown in FIGURE 10 is bank sand which will pass through a No. 4 sieve and 2.4% of which will be retained on a No. 10 sieve; and will pass a No. 10 sieve with 52.8% being retained on a No. 40 sieve.

Figure 11:
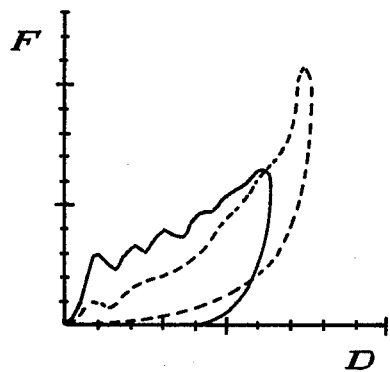

The dampening medium 16 used to obtain the solid line curve of FIGURE 11 is wax having a penetration of 2 to 4 units at 77° F., 100 grams load at 5 seconds; and a specific gravity of 0.95–0.96 at 25° C., a melting point of 185° F. and a viscosity of 65 seconds at 210° F.

Figure 12:
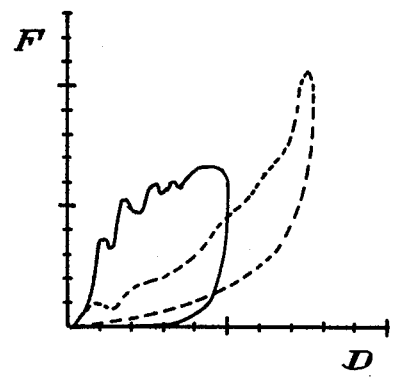

The dampening medium used in the unit according to the invention resulting in the solid line curve of FIGURE 12 is a mixture of the above sand and asphalt; the mixture containing two parts of sand by weight to one part of asphalt by weight.

As can be determined from the curves shown in FIGURE 9, the solid line curve exemplifies the force-distance relationship of a shock attenuating unit with asphalt as the dampening medium, and the dashed line curve is a comparable force-distance curve of a solid rubber unit without any dampening medium therein, and shows the stresses imposed by separate free falls of a 9,000-lb. weight through a distance of ½ inch upon each of the units; each minor division on the abscissa D of the graph representing .050 of an inch and each division on the ordinate F of the graph representing 5,000 lbs. of force.

Thus, in one complete cycle, the asphalt unit has been compressed a distance of .21 inch and reached a maximum reaction force of 46,000 lbs. (as indicated by the actual oscillographs on which the curve of FIGURE 9 is based). The average reaction force can be calculated as follows:

$$4,500 \text{ in. lbs.} + (.21 \text{ in.} \times 9,000 \text{ lbs.}) = 6,390 \text{ in. lbs.}$$

$$\text{Average force} = \frac{6,390}{.21} = 30,400 \text{ lbs.}$$

In one complete cycle of the all-rubber unit under the same distorting conditions, such unit has been compressed a distance of .38 inch and reached a maximum reaction force of 55,000 lbs. The average reaction force for such all-rubber unit is:

$$4,500 \text{ in. lbs.} + (.38 \text{ in.} \times 9,000 \text{ lbs.}) = 7,920 \text{ in. lbs.}$$

$$\text{Average force} = \frac{7,920}{.38} = 20,800 \text{ lbs.}$$

The figure of merit, M, which is the ratio of average force to peak or maximum force is indicative of an optimum operating characteristic for a shock attenuating or absorbing unit. In other words, if M is equal to unity, then optimum operating conditions obtain since there are no isolated peak forces; the peak or maximum force is level and equal to the average force, and a perfect work cycle exists.

It is known that the figure of merit, M, for a helical coil spring obeying Hookes law is always 0.5 since the peak or maximum force is always twice the average force. The figure of merit, M, for the all-rubber unit discussed above equals the average force, as calculated, divided by the maximum force, from the graph, and comes out as 20,800 lbs. divided by 55,000 lbs. or 0.378 which compared to a helical coil spring is less desirable.

A shock attenuating unit according to the invention, however, exhibits an improved figure of merit, where M equals 30,400 lbs. divided by 46,000 lbs. or 0.66. Such figure of merit is better than that achieved by a helical coil spring and of course, is much improved over that of the conventional all-rubber unit.

Though no calculations are shown for the units exemplified by the curves of FIGURES 10, 11 and 12, it is apparent that the units according to the invention have a much lower average reaction force in a corresponding lesser distance of compression than do the all-rubber control units.

Thus, it will be seen that this invention increases the figure of merit of a resilient member through structural modifications while preserving unchanged those desirable properties of the shock attenuating unit, such as, simplicity, economy, ruggedness, adaptability, etc.

From the foregoing description of various embodiments of the invention, it will be appreciated that the objects of the invention are attained by forming a chamber 14 in the resilient member or rubber pad 2 and placing within such chamber a dampening material of the type which is pressure deformable and substantially non-compressible and which enmasse has little or no resiliency, though the individual particles making up the mass may be resilient in and of themselves. A quantity of sand can be considered as pressure deformable and capable of flow, although the discrete particles thereof are solid and substantially noncompressible and individually may exhibit resiliency to a degree common with that of a comparable solid. The minimization of recoil is attained by confining the dampening material within the chamber formed in the unit according to the invention so that upon the application of a distorting load force, part of the force is transmitted into the resilient material for storage therein and the balance thereof is transmitted into the dampening material to be expended or attenuated therein and transformed into heat energy by reason of the multitude of frictional contacts between discrete particles constituting said dampening medium, if a material such as sand is employed. If a viscous dampening material is used, such as asphalt, then in theory molecular friction or cohesion is responsible for the dissipation of energy. It may well be that when a mixture of discrete particles and a viscous material is housed in the chamber, both frictional surface contacts, as well as molecular friction or cohesion are exhibited and by this dual means absorb the applied energy.

The dampening material used within the chamber of the shock attenuating unit, having no self-restoring resiliency when considered either as a mass constituted by a multiplicity of discrete particles, or as a mass of viscous material, each mass having a de minimis resiliency as compared to the high resiliency of the surrounding resilient member, will be restored to its original non-deformed condition primarily, if not solely, by the restoring force of the resilient member when the latter is permitted to exercise its self-restoring characteristics by the removal of or the dissipation of the impact or distorting load force.

The shock absorbing unit of this invention in its broad aspects may be considered to be a hydraulic device even though conventional hydraulic liquid need not be used as the dampening medium in the chamber 14. Whether the dampening medium be a low viscosity liquid or high viscosity asphalt, or a mass of discrete particles, such as sand or aluminum oxide, or a mixture thereof, the unit according to the invention will exhibit hydraulic or psuedo-hydraulic flow upon the application of a compressive force to the upper and lower plates 8 and 10 of the unit. The application of a compressive force to the plates 8 and 10 causes the rubber member 2 to flow outwardly away from the center of the plates 8 and 10 and as it does so the dampening material in the chamber 14 similarly flows, the net result being that the over-all effective area of the dampening material is increased, whereas the thickness thereof is diminished. Recognizing that hydraulic principles of operation are present during the functioning of the unit according to the invention indicates that orifices can be utilized to control the throttling effect obtainable from forcing hydraulic liquids or plastic solids, such as wax or asphalt, through a constant or through a decreasing or through an increasing orifice opening. The unit shown in FIGURE 1 is one which operates by or according to hydraulic principles since the effective orifice is equivalent to the internal peripheral surface of the rubber defining the sides of the chamber 14. As the plates 8 and 10 are moved toward each other, this peripheral orifice decreases in height and causes a throttling of the medium 16 within the chamber as it flows outwardly.

It is apparent from the foregoing description that many variations may be utilized in the manufacture of the shock attenuating units according to the invention. Also new synthetic materials are constantly being developed and made commercially available, many of which undoubtedly will be found adaptable as dampening mediums or resilient members. The invention lies in the physical relation or mechanical correlation of suitable components, and their individual composition is important only in the sense that the individual properties of the elements of any mechanical assemblage are important to their proper combination and co-action. From his knowledge of the materials available, the mechanical engineer will know or deduce with confidence their applicability to the purposes of the invention, and in the case of novel materials, routine tests not of an inventive nature will provide reliable data. It is intended, therefore, that all matters shown in the accompanying drawings and described hereinbefore shall be interpreted as illustrative and not in a limiting sense.

What I claim is:

1. A shock attenuating unit comprising a unitary, annular, resilient member having two opposite and parallel force-receiving surfaces spaced a distance apart less than the least width of said member; means including a pair of non-extensible support elements each bonded to one of said surfaces and providing a closed chamber, and a non-resilient deformable dampening medium filling said chamber and being confined therein in a manner permitting movement of the parts or particles thereof relative to the surface portions of said support elements and resilient member defining said chamber, at least one of said elements being bonded throughout an area which is equal to or greater than the least cross-sectional area of the chamber-defining side wall and which is at least equal to or greater than fifty percent of an end area of said chamber, said dampening medium after deformation being returnable to its original non-deformed condition solely by the resilient member.

2. A shock attenuating unit comprising a unitary resilient member having two opposite and parallel force-receiving surfaces spaced a distance apart less than the least width of said member; an opening in such member extending from one to the other of such surfaces; a pair of non-extensible support elements each bonded to the resilient member along at least a portion of said surfaces to overlie and close the ends of said opening and form a chamber in said member; a flow guide provided on at least one of said elements and having a portion projecting inwardly of said chamber; and a non-resilient deformable dampening material filling said chamber and being confined therein in a manner permitting movement of the parts or particles thereof relative to the surface portions of said support elements and resilient member defining said chamber and said flow guide projecting therein, said material after deformation being returnable to its original non-deformed condition solely by the unitary resilient member.

3. A shock attenuating unit according to claim 2 in which at least one of said elements has an opening therethrough communicable with said chamber, and a non-extensible closure element is provided for closing such opening.

4. A shock attenuating unit comprising a unitary resilient member having two opposite and parallel force-receiving surfaces spaced a distance apart less than the least width of said member, an opening in such resilient member extending from one to the other of such surfaces; a pair of non-extensible support elements each bonded to one of said surfaces to overlie and close the ends of said opening and form a chamber in such resilient member; at least one of the non-extensible elements constituting a main support element being bonded throughout an area which is equal to or greater than the least cross-sectional area of the chamber-defining side wall of the resilient member and which is at least equal to or greater than fifty percent of the end area opening; and a non-resilient deformable dampening material filling said chamber and being confined therein in a manner permitting movement of the parts or particles thereof relative to the surface portions of said support elements and resilient member defining said chamber, said dampening material after deformation being returnable to its original non-deformed condition solely by the unitary resilient member.

5. A shock attenuating unit according to claim 4 in which at least one of said elements is provided with a flow guide projecting inwardly of the chamber.

6. A shock attenuating unit according to claim 4 in which the non-extensible support elements are each bonded to a force-receiving surface of the resilient member throughout the areal extent of such surface.

7. A shock attenuating unit according to claim 4 in which said main support element is bonded to said force-receiving surface of the resilient member throughout the entire areal extent of such surface.

8. A shock attenuating unit comprising a unitary resilient member having two opposite and parallel force-receiving surfaces spaced a distance apart less than the least width of said member; a non-extensible support element bonded to one of said surfaces; a chamber in said resilient member adjacent said support element, and said chamber being filled with asphalt with said asphalt being confined therein in a manner permitting movement of the parts or particles thereof relative to the surface portions of said support element and resilient member defining said chamber whereby to provide a non-resilient deformable dampening medium therein, said support element being bonded to said one force-receiving surface throughout an area which is equal to or greater than the least cross-sectional area of the chamber-defining side wall and which is at least equal to or greater than fifty percent of an end area of said chamber, said asphalt after deformation being returnable to its original non-deformed condition solely by the resilient member.

9. A shock attenuating unit comprising a unitary resilient member having two opposite and parallel force-receiving surfaces spaced a distance apart less than the least width of said member; a non-extensible support element bonded to one of said surfaces; a chamber in said resilient member adjacent said support element, and said chamber being filled with a mass of discrete solid particles with said mass of discrete solid particles being confined therein in a manner permitting movement of the particles relative to the surface portions of said support element and resilient member defining said chamber whereby to provide a non-resilient deformable dampening medium therein, said support element being bonded to said one force-receiving surface throughout an area which is equal to or greater than the least cross-sectional area of the chamber-defining side wall and which is at least equal to or greater than fifty percent of an end area of said chamber, said mass of discrete solid particles after deformation being returnable to its original non-deformed condition solely by the resilient member.

10. A shock attenuating device comprising a pair of shock attenuating units each of which is characterized by a unitary resilient member having two opposite and parallel force-receiving surfaces spaced a distance apart less than the least width of said member and having an opening formed therein which extends from one to the other of such surfaces, and by a non-extensible end support element bonded to one of said surfaces of each said member to overlie and close one end of said opening, each of said non-extensible end support elements being bonded throughout an area which is equal to or greater than the least cross-sectional area of the opening-defining side wall of the resilient member and which is at least equal to or greater than fifty percent of the end area opening; a non-extensible intermediate support element having a central opening formed therein which conforms in size and shape to said openings in said resilient members, the other force-receiving surfaces of said resilient members being bonded to the opposite faces of said intermediate support element throughout the areal extent of said surfaces whereby said pair of units are retained in stacked relationship and whereby said end support elements, said opening-defining side walls of said resilient members, and said opening-defining portion of said intermediate support element define a single continuous chamber in said pair of stacked units; and a non-resilient deformable dampening material filling said chamber and being confined therein in a manner permitting movement of the parts or particles thereof relative to the surface portions of said support elements and resilient members defining said chamber; the dampening material in said chamber being returnable to its original non-deformed condition after deformation thereof solely by the resilient members.

11. The device according to claim 10 in which each end support element is bonded to the force-receiving surface of its associated resilient member throughout the areal extent of such surface.

12. A shock attenuating device comprising a stack of shock attenuating units each of which is characterized by a unitary resilient member having two opposite and parallel force-receiving surfaces spaced a distance apart less than the least width of said member and having an opening formed therein which extends from one to the other of such surfaces; each end unit of the stack having a non-extensible end support element bonded to its outermost force-receiving surface to overlie and close the outer end of said opening therein, each of said non-extensible end support elements being bonded throughout an area which is equal to or greater than the least cross-sectional area of the opening-defining side wall of the resilient member and which is at least equal to or greater than fifty percent of the end area opening, the other force-receiving surface of said resilient member of each of said end units having a non-extensible intermediate support element bonded thereto which is characterized by a central opening which conforms in size and shape to said openings in said resilient members; another of the units of the stack having a pair of non-extensible intermediate support elements bonded to the opposite force-receiving surfaces thereof which are characterized by central openings which conform in size and shape to said openings in said resilient members; adjacent ones of said intermediate support elements being bonded to each other and to their associated resilient members throughout the areal extent thereof whereby all of said shock attenuating units are retained in stacked relationship and whereby said end support elements, said opening-defining side walls of said resilient members, and said opening-defining portions of said intermediate support elements define a single continuous chamber in said stack of units; and a non-resilient deformable dampening material filling said chamber and being confined therein in a manner permitting movement of the parts or particles thereof relative to the surface portions of said support elements and resilient members defining said chamber; the dampening material in said chamber being returnable to its original non-deformed condition after deformation thereof solely by the resilient members.

13. The device according to claim 12 in which each end support element of said end units is bonded to the force-receiving surface of its associated resilient member throughout the areal extent of such surface.

References Cited in the file of this patent

UNITED STATES PATENTS

| 87,307 | Sterne | Feb. 23, 1869 |
| 2,359,915 | Hussman | Oct. 10, 1944 |
| 2,535,080 | Lee | Dec. 26, 1950 |
| 2,540,130 | Lee | Feb. 6, 1951 |
| 2,732,040 | De Vost et al. | Jan. 24, 1956 |
| 2,733,915 | Dentler | Feb. 7, 1956 |
| 2,818,249 | Boschi | Dec. 31, 1957 |
| 2,830,833 | Alldredge et al. | Apr. 15, 1958 |
| 3,007,692 | Kniffin | Nov. 7, 1961 |

FOREIGN PATENTS

| 762,631 | France | Jan. 22, 1934 |